US012115689B2

(12) United States Patent
Ashcroft et al.

(10) Patent No.: US 12,115,689 B2
(45) Date of Patent: Oct. 15, 2024

(54) PERSONAL CARE DEVICES AND COMPONENTS

(71) Applicant: Sincerely Ltd. LLC, San Francisco, CA (US)

(72) Inventors: Anthony Ashcroft, San Francisco, CA (US); Joshua Funamura, Oakland, CA (US); Jonathan P. Ive, San Francisco, CA (US); Patrick Kessler, San Francisco, CA (US); Eugene Whang, San Francisco, CA (US); Christopher Wilson, Sonoma, CA (US); Suhang Zhou, San Francisco, CA (US)

(73) Assignee: Sincerely, Ltd. LLC, San Francisco, CA (US)

( * ) Notice: Subject to any disclaimer, the term of this patent is extended or adjusted under 35 U.S.C. 154(b) by 0 days.

(21) Appl. No.: 18/232,188

(22) Filed: Aug. 9, 2023

(65) Prior Publication Data

US 2023/0381989 A1 Nov. 30, 2023

Related U.S. Application Data

(62) Division of application No. 17/351,174, filed on Jun. 17, 2021, now Pat. No. 11,731,297.

(51) Int. Cl.
*B26B 19/38* (2006.01)
*B26B 19/06* (2006.01)
*B26B 19/40* (2006.01)

(52) U.S. Cl.
CPC .......... *B26B 19/3886* (2013.01); *B26B 19/06* (2013.01); *B26B 19/40* (2013.01)

(58) Field of Classification Search
CPC ..... B26B 19/06; B26B 19/063; B26B 19/066; B26B 19/08; B26B 19/3886; B26B 19/40
See application file for complete search history.

(56) References Cited

U.S. PATENT DOCUMENTS

| | | | | | |
|---|---|---|---|---|---|
| 658,094 | A | | 9/1900 | Palmer | |
| 1,566,797 | A | | 12/1925 | Holtzman | |
| 1,816,404 | A | * | 7/1931 | Schwarz | B26B 21/18 30/36 |
| 2,109,507 | A | | 3/1938 | Salz | |
| 2,802,077 | A | * | 8/1957 | Taylor | H01H 15/18 200/437 |
| 2,967,354 | A | | 1/1961 | Ahlborn | |
| 3,083,456 | A | * | 4/1963 | Marchant | B26B 19/282 30/220 |
| 3,156,804 | A | * | 11/1964 | Springer | H01H 9/06 200/16 R |
| 3,204,071 | A | * | 8/1965 | Passarelli, Jr. | H01H 23/30 200/557 |
| 3,311,763 | A | * | 3/1967 | Jepson | H01R 13/26 310/239 |
| 3,344,520 | A | | 10/1967 | Williams | |

(Continued)

*Primary Examiner* — Adam J Eiseman
*Assistant Examiner* — Richard D Crosby, Jr.
(74) *Attorney, Agent, or Firm* — Locke Lord LLP; Joshua L. Jones; Gabrielle L. Gelozin

(57) ABSTRACT

In certain embodiments, a personal care device can include a housing, a functional assembly attached to the housing, a motor disposed within the housing and operatively connected to the functional assembly to move one or more components of the functional assembly, and a switch configured to move between at least two states.

8 Claims, 17 Drawing Sheets

(56) References Cited

U.S. PATENT DOCUMENTS

| | | | | |
|---|---|---|---|---|
| 3,386,023 | A * | 5/1968 | Jepson | H02J 7/02 307/66 |
| 3,405,243 | A * | 10/1968 | Cherry | H01H 13/28 200/465 |
| 3,489,874 | A * | 1/1970 | Baumann | H01H 1/403 200/470 |
| 3,643,051 | A * | 2/1972 | Foley | H01H 23/164 200/275 |
| 3,797,109 | A * | 3/1974 | Yamada | B26B 19/38 30/43.6 |
| 3,872,586 | A | 3/1975 | Oguchi | |
| 3,872,587 | A | 3/1975 | Wellinger | |
| 4,159,566 | A | 7/1979 | Patrin | |
| 4,426,776 | A * | 1/1984 | Kakumoto | B26B 19/38 30/41 |
| 4,509,259 | A * | 4/1985 | Kakumoto | B26B 19/3866 30/43.9 |
| 4,521,962 | A | 6/1985 | Van Natta | |
| 4,581,822 | A * | 4/1986 | Fujimura | B26B 19/3846 30/220 |
| 4,622,745 | A | 11/1986 | Wahl | |
| 4,651,761 | A * | 3/1987 | Suen | B26B 19/20 132/148 |
| 4,653,519 | A * | 3/1987 | Kanner | A61L 12/086 310/104 |
| 4,709,475 | A | 12/1987 | Phung | |
| 4,744,144 | A * | 5/1988 | Lowery, Sr. | B26B 21/38 30/DIG. 1 |
| 4,918,818 | A * | 4/1990 | Hsieh | B26B 21/405 30/34.05 |
| 5,050,373 | A * | 9/1991 | Asatsuma | A01D 34/404 56/246 |
| 5,259,115 | A * | 11/1993 | Bluder | B26B 19/20 30/201 |
| 5,732,470 | A * | 3/1998 | Labarbara | B26B 21/38 30/44 |
| 6,131,288 | A * | 10/2000 | Westerhof | B26B 19/3886 30/538 |
| 6,305,083 | B1 * | 10/2001 | Rijken | A61C 17/225 30/43.6 |
| 6,347,456 | B1 | 2/2002 | Jones et al. | |
| 6,543,788 | B2 * | 4/2003 | Ito | B26B 19/3866 277/630 |
| 6,865,816 | B1 * | 3/2005 | Zajdel | B26B 5/00 30/162 |
| 7,100,285 | B1 * | 9/2006 | Huang | B26B 5/001 30/162 |
| 7,188,422 | B2 | 3/2007 | McCambridge et al. | |
| 8,006,391 | B1 * | 8/2011 | Mashburn | B26B 5/00 83/698.21 |
| 8,132,332 | B2 | 3/2012 | Tautscher et al. | |
| 8,341,846 | B1 * | 1/2013 | Holmes | B26B 19/20 30/208 |
| 8,533,960 | B1 * | 9/2013 | Barish | B26B 19/14 30/43.6 |
| 8,763,256 | B2 * | 7/2014 | Gratsias | B26B 21/38 30/44 |
| 8,800,152 | B2 | 8/2014 | Werner | |
| 8,806,757 | B2 | 8/2014 | Moseman | |
| 9,038,276 | B2 * | 5/2015 | Arndt | B26B 19/06 30/208 |
| 9,707,690 | B2 * | 7/2017 | Hodgson | B26B 21/4018 |
| 9,943,972 | B2 | 4/2018 | Werner | |
| D825,853 | S | 8/2018 | Skye | |
| 10,160,125 | B1 | 12/2018 | Skye | |
| 11,235,483 | B2 | 2/2022 | Hahn et al. | |
| 11,504,864 | B2 | 11/2022 | Werner et al. | |
| 11,642,805 | B2 * | 5/2023 | Liberatore | B26B 21/443 30/47 |
| 2003/0221318 | A1 * | 12/2003 | Iwashita | B26B 19/38 30/43.2 |
| 2004/0181946 | A1 * | 9/2004 | Lemisch | B26B 1/04 30/153 |
| 2005/0028371 | A1 * | 2/2005 | Kakimoto | B26B 19/288 30/43.92 |
| 2005/0217118 | A1 * | 10/2005 | Mah | B25F 1/003 30/261 |
| 2006/0288581 | A1 * | 12/2006 | Rogatschnig | B26B 19/3853 30/34.1 |
| 2007/0144014 | A1 * | 6/2007 | Toyama | B25B 7/14 30/254 |
| 2008/0034591 | A1 * | 2/2008 | Fung | B26B 19/3866 30/529 |
| 2008/0163499 | A1 * | 7/2008 | Ojeda | B43L 23/00 30/453 |
| 2008/0289191 | A1 * | 11/2008 | LeBlanc | B26B 1/042 30/160 |
| 2008/0313909 | A1 * | 12/2008 | Haczek | B26B 19/3853 30/45 |
| 2009/0019706 | A1 | 1/2009 | Werner et al. | |
| 2009/0199413 | A1 | 8/2009 | Tautscher et al. | |
| 2010/0037463 | A1 * | 2/2010 | Maichel | B26B 19/3813 30/526 |
| 2010/0064520 | A1 * | 3/2010 | Park | B26B 21/38 30/29.5 |
| 2010/0064527 | A1 | 3/2010 | Lee et al. | |
| 2010/0139103 | A1 | 6/2010 | Miyazaki | |
| 2010/0242286 | A1 * | 9/2010 | Yerke | B26B 19/3853 30/133 |
| 2011/0061779 | A1 * | 3/2011 | Tilgner | B26B 19/3813 150/154 |
| 2011/0162207 | A1 * | 7/2011 | Maichel | B26B 19/3813 30/34.1 |
| 2011/0308090 | A1 * | 12/2011 | Ho | B26B 5/003 30/152 |
| 2012/0311865 | A1 * | 12/2012 | Hamilton | B23K 26/348 30/32 |
| 2013/0219724 | A1 | 8/2013 | Werner | |
| 2013/0312265 | A1 | 11/2013 | Wilson et al. | |
| 2013/0312272 | A1 | 11/2013 | Wilson et al. | |
| 2014/0190014 | A1 | 7/2014 | Hahn | |
| 2014/0352158 | A1 | 12/2014 | McCambridge et al. | |
| 2015/0174776 | A1 | 6/2015 | Hawes | |
| 2015/0360377 | A1 * | 12/2015 | Tomassetti | B26B 21/4012 30/34.05 |
| 2016/0039100 | A1 * | 2/2016 | Wang | B26B 5/001 30/123 |
| 2016/0089800 | A1 * | 3/2016 | Coresh | B26B 21/405 30/45 |
| 2016/0107324 | A1 * | 4/2016 | Robertson | B26B 21/22 30/53 |
| 2016/0121496 | A1 * | 5/2016 | Johnson | B26B 21/4012 30/532 |
| 2016/0144518 | A1 * | 5/2016 | Zijlstra | B26B 19/20 30/201 |
| 2017/0225343 | A1 * | 8/2017 | Suzuki | B26B 19/3866 |
| 2018/0085953 | A1 * | 3/2018 | Perez Lopez | A61C 17/221 |
| 2018/0126570 | A1 * | 5/2018 | Werner | B26B 19/3846 |
| 2018/0290318 | A1 | 10/2018 | Khubani et al. | |
| 2019/0098982 | A1 | 4/2019 | Atlason et al. | |
| 2020/0055205 | A1 | 2/2020 | Werner et al. | |
| 2020/0269453 | A1 | 8/2020 | Hahn et al. | |
| 2022/0134587 | A1 | 5/2022 | Hahn et al. | |

* cited by examiner

PERSONAL CARE DEVICES AND COMPONENTS

CROSS-REFERENCE TO RELATED APPLICATIONS

This application claims priority to and the benefit of U.S. Provisional application Ser. No. 17/351,174, filed Jun. 17, 2021, the entire contents of which are herein incorporated by reference in their entirety.

FIELD

This disclosure relates to personal care devices and components (e.g., beard trimmers).

BACKGROUND

Conventional personal care devices and components have generally been considered satisfactory for their intended purpose. However, there is still a need in the art for improved personal care devices and components. The present disclosure provides a solution for this need.

SUMMARY

In accordance with at least one aspect of this disclosure, a personal care device can include a housing, a functional assembly attached to the housing, a motor disposed within the housing and operatively connected to the functional assembly to move one or more components of the functional assembly, and a switch configured to move between at least two states, the at least two states including an on position wherein the motor is activated, and an off position wherein the motor is deactivated. In certain embodiments, the functional assembly can be a hair trimmer assembly. The hair trimmer assembly can include a trimmer body configured to be fixed relative to the housing. The trimmer body can include a magnetic interface configured to allow a removable guard to magnetically attach to the trimmer body.

In certain embodiments, the magnetic interface can include one or more dimples defined in the trimmer body. The one or more dimples can include two dimples.

The magnetic interface can include one or more magnets fixed to the trimmer body in a position adjacent each of the one or more dimples. Each magnet can be held within an interior cavity of a hollow screw threaded into the trimmer body or is otherwise attached to the functional assembly. Any other suitable structure or method for holding the magnets is contemplated herein. Certain embodiments can include a trimmer guard comprising one or more bumps configured to insert into and the one or more dimples. The one or more bumps can be made of material attracted to the magnets.

Embodiments can include a means for attaching a guard to a trimmer as described herein.

In accordance with at least one aspect of this disclosure, a personal care device, e.g., as disclosed herein, e.g., as described above, can include a switch that is moveably retained to the housing using a magnetic connection and is otherwise not anchored to the housing. In certain embodiments, a personal care device can include a switch that is moveably retained to the housing using a magnetic connection such that different positions have different forces to move the switch therefrom. In certain embodiments, the switch can include at least three states including the on position, the off position, and a lock position. In certain embodiments, the magnetic connection in the lock position can require the most force to move the switch out of the lock state relative to the other positions. In certain embodiments, the force required to move the switch out of the off position and out of the on position can be about the same.

The switch can include a plurality of switch magnets mounted on or within an underside thereof. The housing can include a plurality of housing magnets disposed on or within the housing in a position configured to magnetically interact with one or more of the plurality of switch magnets in at least one of the positions. There can be a different amount of (e.g., fewer) housing magnets than switch magnets, for example. In certain embodiments, the amount or strength of magnets interacting with each other is different between at least two positions. In certain embodiments, the personal care device is a hair trimmer.

A hair trimmer can include a clamshell housing having a first piece and a second piece configured to mate together, a trimmer assembly attached to the housing, a motor disposed within the housing and operatively connected to the trimmer assembly to move one or more components of the trimmer assembly, and a switch configured to move between at least two states, the at least two states including an on position wherein the motor is activated, and an off position wherein the motor is deactivated. The first piece of the housing and the second piece of the housing can be connected together by a single fastener.

In certain embodiments, the single fastener can be disposed in a well on the first piece configured to be hidden by the switch. The first piece can define a switch housing configured to receive a top shaped switch on an outside thereof, including a post well configured to receive a post of the switch.

The second piece can include a mounting structure defining a post aperture on an internal surface thereof to receive the post well. The single fastener can mate with the mounting structure. In certain embodiments, the device can include a gasket disposed between the first piece and the second piece to seal internal components. In certain embodiments, the first piece can include a plurality of magnets disposed in the switch housing to interact with one or more magnets on the switch.

Embodiments can include a hair trimmer means as described herein. Embodiments can include a magnetic switch means for electronic devices, (e.g., hair trimmers, toothbrushes, etc.) as described herein. Embodiments can include housing means for hair trimmers. Any suitable components of a personal care device and/or hair trimmer disclosed herein can be applied to any suitable electronic devices, and are not limited to personal care devices and/or hair trimmers.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1A:
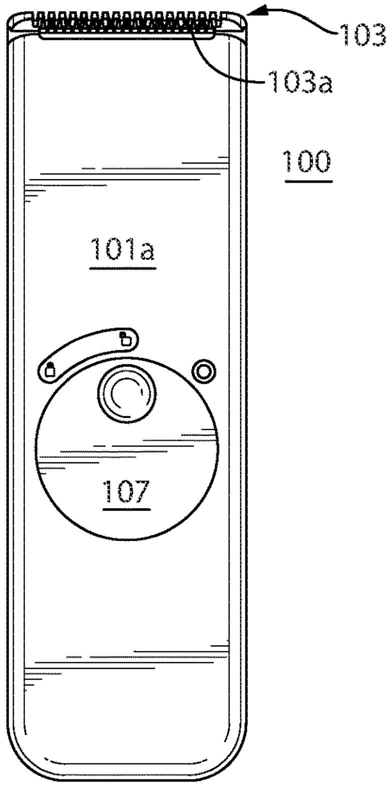
FIGS. 1A, 1B, 1C, 1D, 1E show a front, rear, side, top, and bottom view, respectively, of an embodiment of a personal care device in accordance with this disclosure.
Figure 1B:
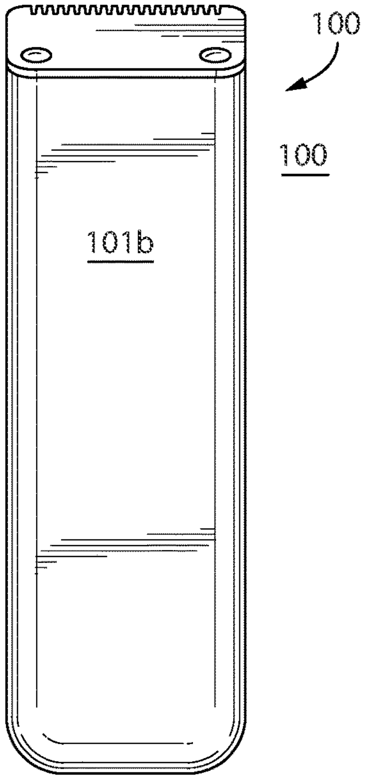
Figure 1C:
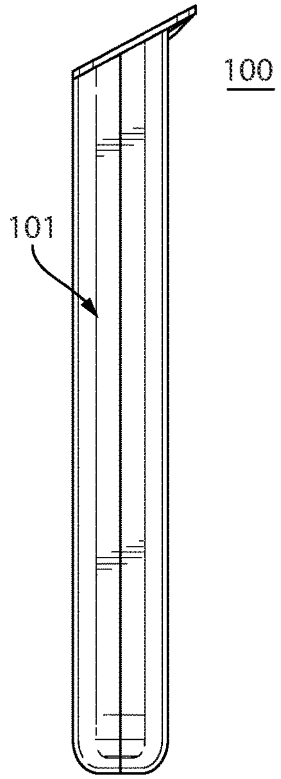
Figure 1D:
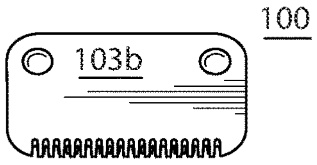
Figure 1E:
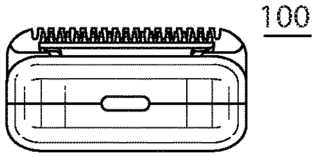
Figure 2:
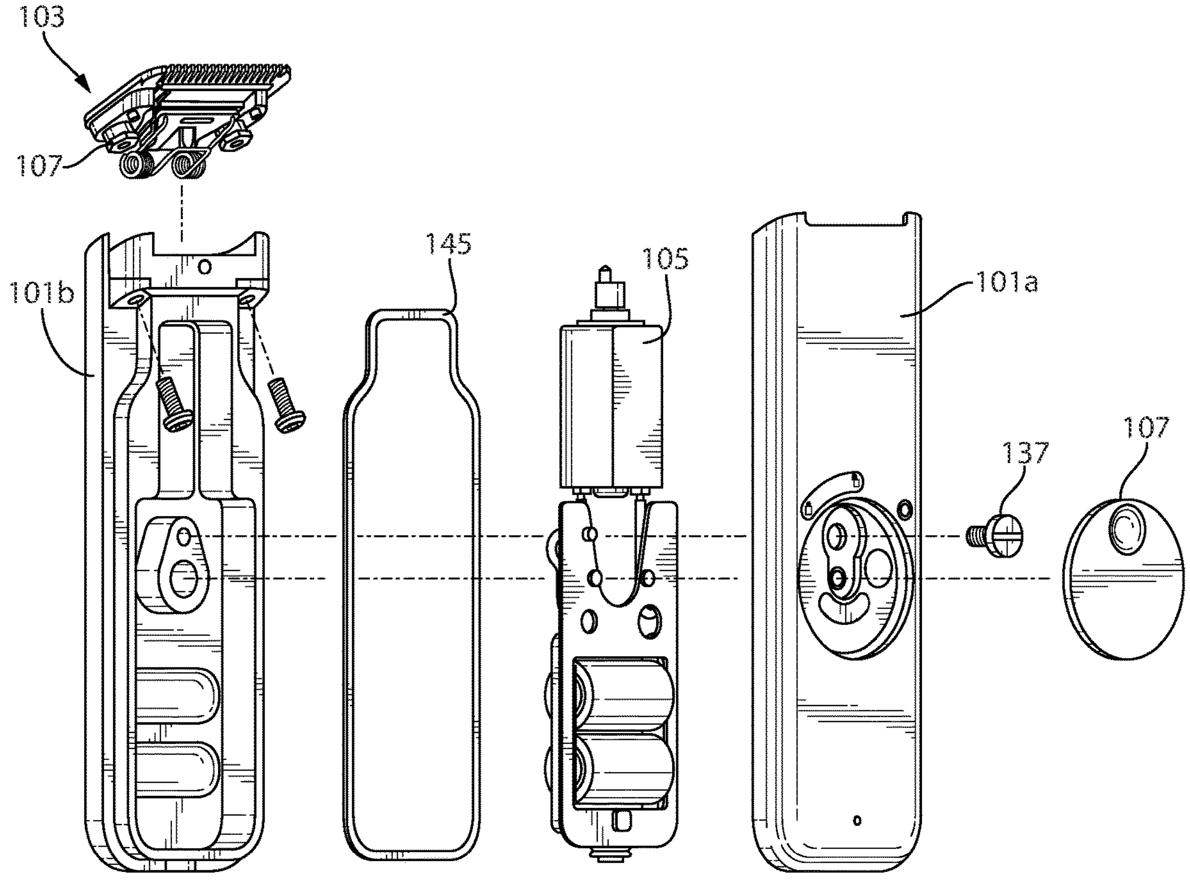
FIG. 2 shows an exploded view of the embodiment of FIG. 1A.
Figure 3:
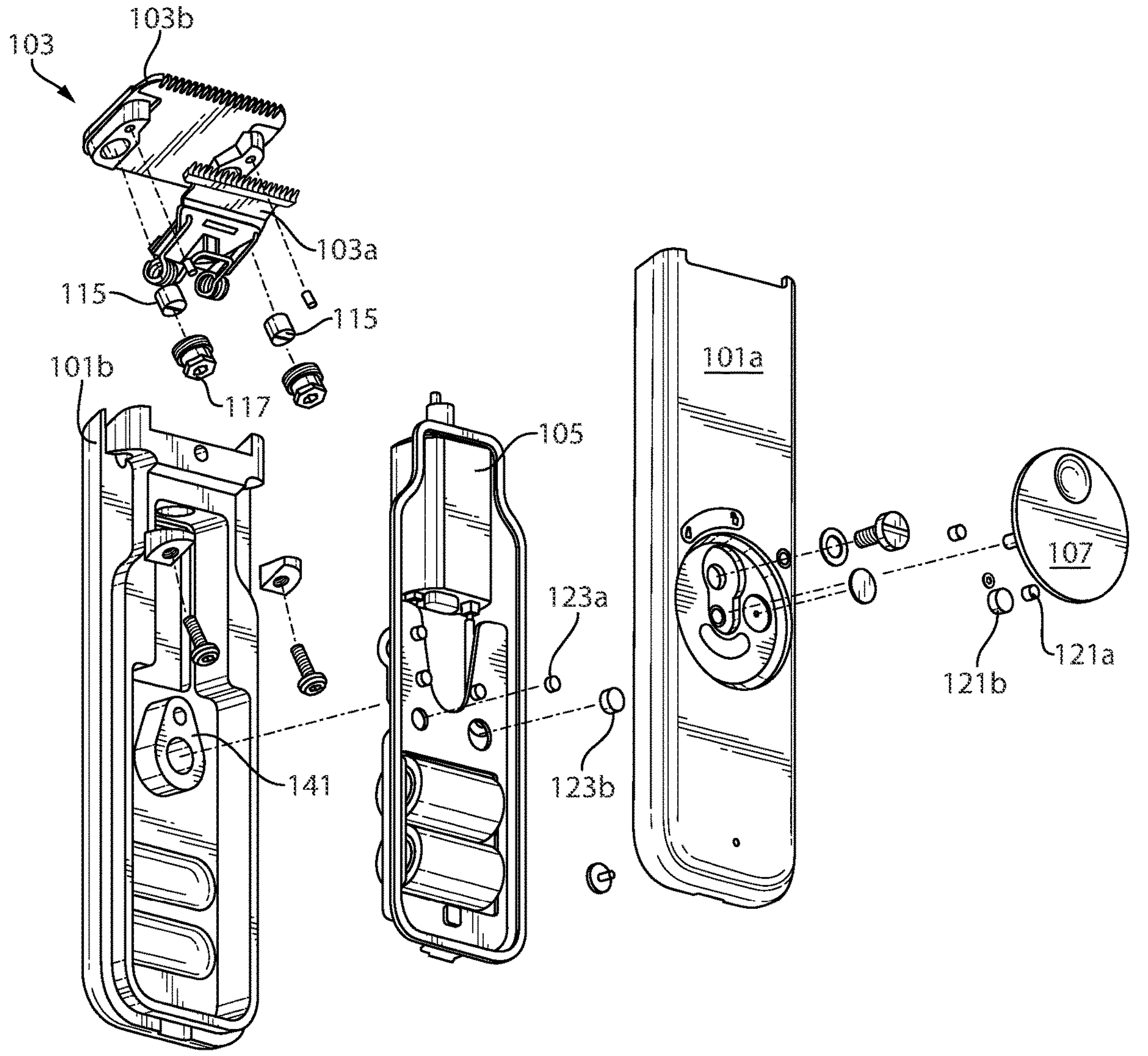
FIG. 3 shows another exploded view of the embodiment of FIG. 1A.
Figure 4:
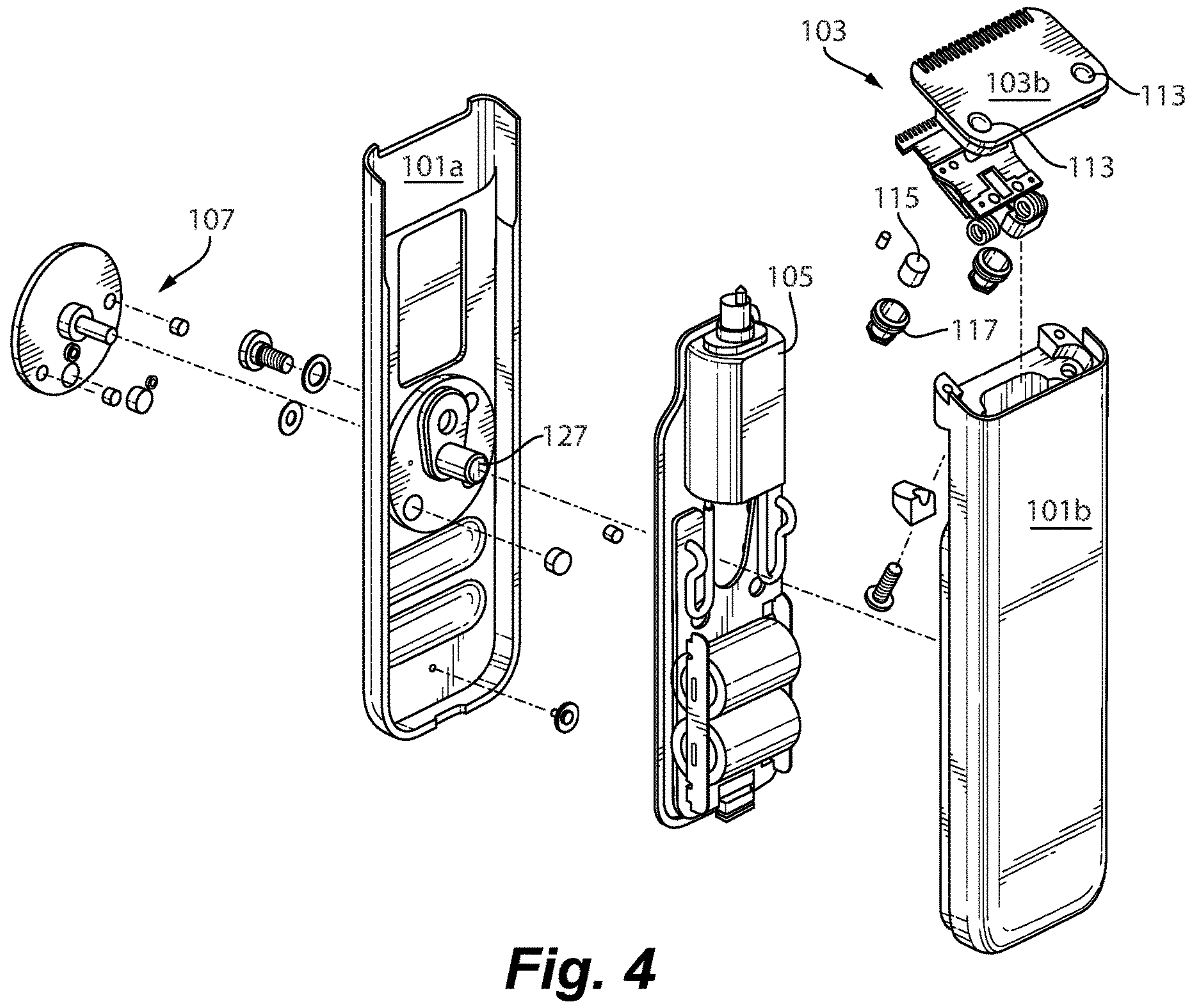
FIG. 4 shows another exploded view of the embodiment of FIG. 1A.
Figure 5:
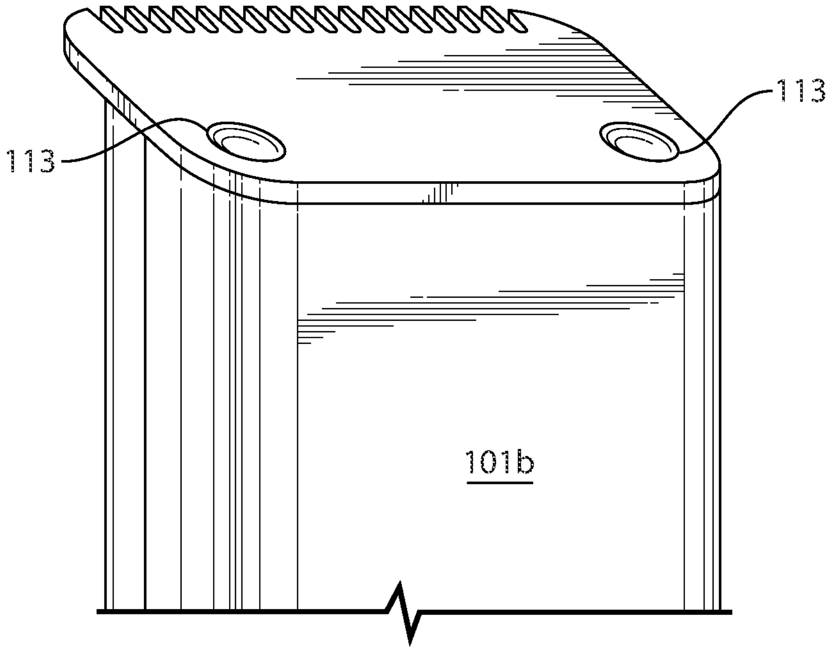
FIG. 5 shows a perspective view of a functional end of the embodiment of FIG. 1A, showing dimples in a trimmer body.
Figure 6:
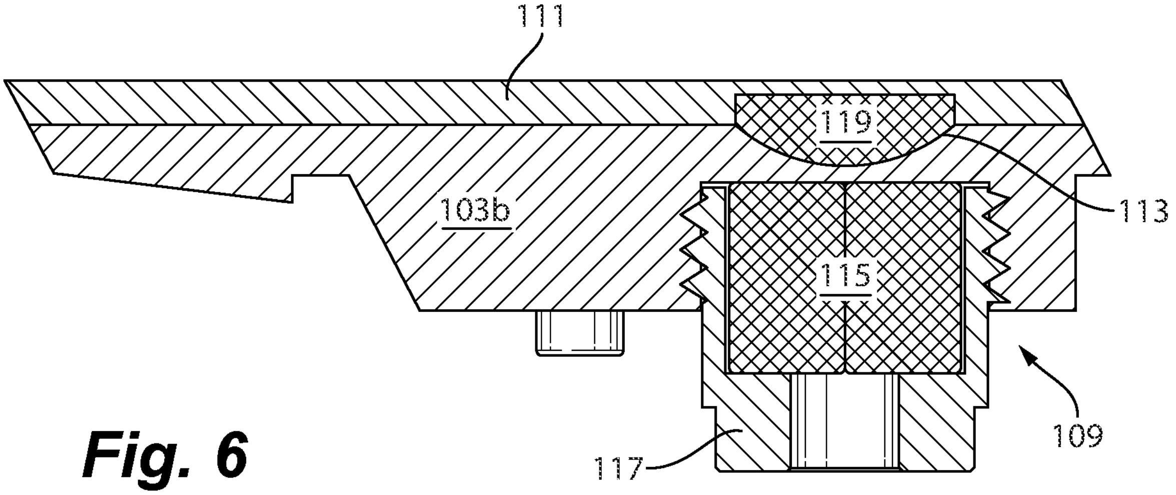
FIG. 6 shows a cross-sectional view of an embodiment of a portion of a trimmer assembly, showing a magnetic interface and a removable trimmer guard magnetically interacting with the trimmer body.

Reference will now be made to the drawings wherein like reference numerals identify similar structural features or aspects of the subject disclosure. For purposes of explanation and illustration, and not limitation, an illustrative view of an embodiment of a personal care device in accordance with the disclosure is shown in FIGS. 1A and 1*s* designated generally by reference character 100. Other embodiments and/or aspects of this disclosure are shown in FIGS. 2-27.

Referring to FIGS. 1A-5, in accordance with at least one aspect of this disclosure, a personal care device 100 can include a housing 101 (e.g., made up of first piece 101*a* and second piece 101*b*), a functional assembly 103 attached to the housing 101, a motor 105 disposed within the housing 100 and operatively connected to the functional assembly 103 to move one or more components (e.g., a trimmer blade 103*a*) of the functional assembly 103, and a switch 107 configured to move between at least two states, the at least two states including an on position wherein the motor 105 is activated, and an off position wherein the motor 105 is deactivated. In certain embodiments, the functional assembly 103 can be a hair trimmer assembly as shown. The hair trimmer assembly can include a trimmer body 103*b* configured to be fixed relative to the housing 101 (e.g., attached to second piece 101*b*).

Referring additionally to FIGS. 6-9, the trimmer body 103*b* can include a magnetic interface 109 configured to allow a removable guard 111 to magnetically attach to the trimmer body 103*b*.

In certain embodiments, the magnetic interface 109 can include one or more dimples 113 defined in the trimmer body 103*b*. The one or more dimples 113 can include two dimples 113, e.g., as shown. Any suitable number of dimples is contemplated herein.

The magnetic interface 109 can include one or more magnets 115 (e.g., soft magnet or hard magnet) fixed to the trimmer body 103*b* in a position adjacent (e.g., directly underneath and centered) each of the one or more dimples 113. Any suitable magnet type is contemplated herein (e.g., rare earth magnets). Each magnet 115 can be held within an interior cavity of a hollow screw 117 threaded into the trimmer body 103*b*, e.g., as shown. Each magnet 115 can be held to and/or within the trimmer body 103*b* in any other suitable manner. Certain embodiments can include a trimmer guard 111 comprising one or more bumps 119 configured to insert into and the one or more dimples 113. The one or more bumps 119 can be made of material attracted to the magnets (e.g., a ferromagnetic material, a magnetic material, etc.). Embodiments can include a means for attaching a guard to a trimmer as disclosed.

Figure 7:
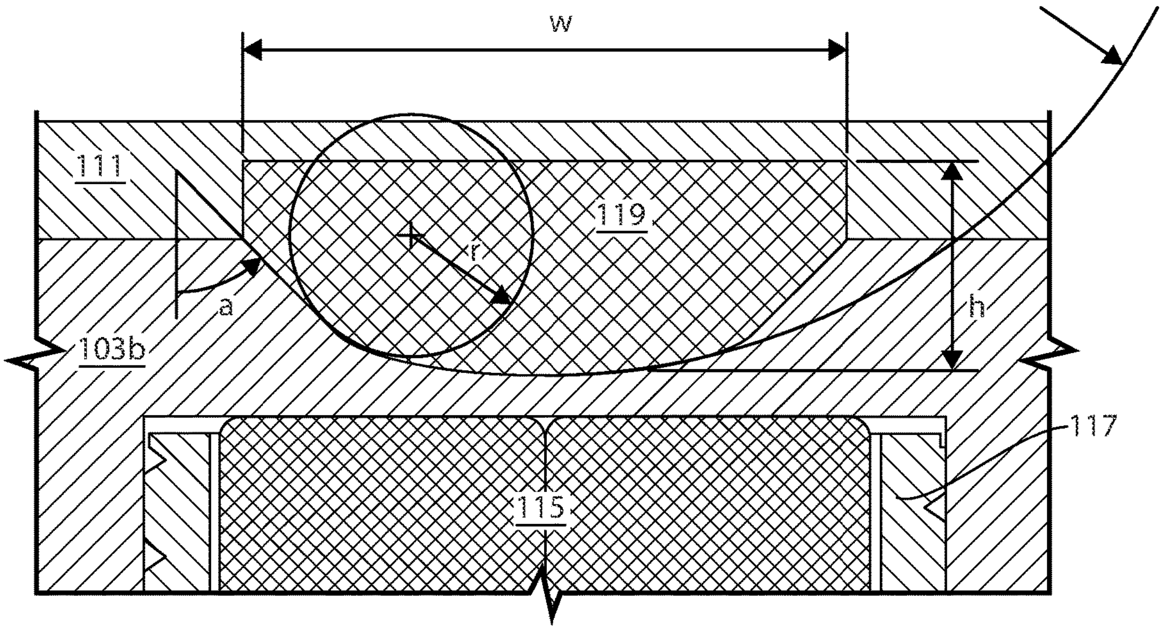
FIG. 7 is a zoomed view of the embodiment shown in FIG. 6, showing bumps of the guard inserted into dimples of the trimmer body.
Figure 8A:
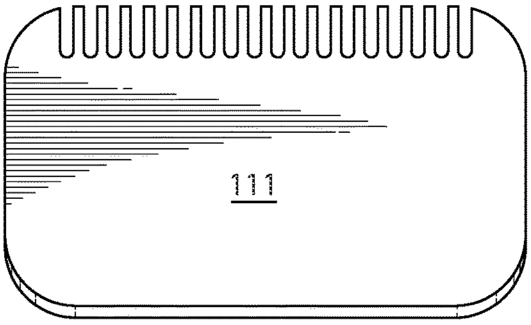
FIGS. 8A and 8B show a top view and a bottom view, respectively, of an embodiment of a trimmer guard, shown having bumps made of magnetic material (e.g., ferromagnetic or magnetic)
Figure 8B:
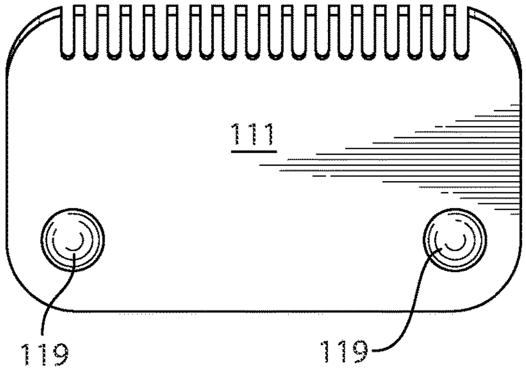
Figure 9:
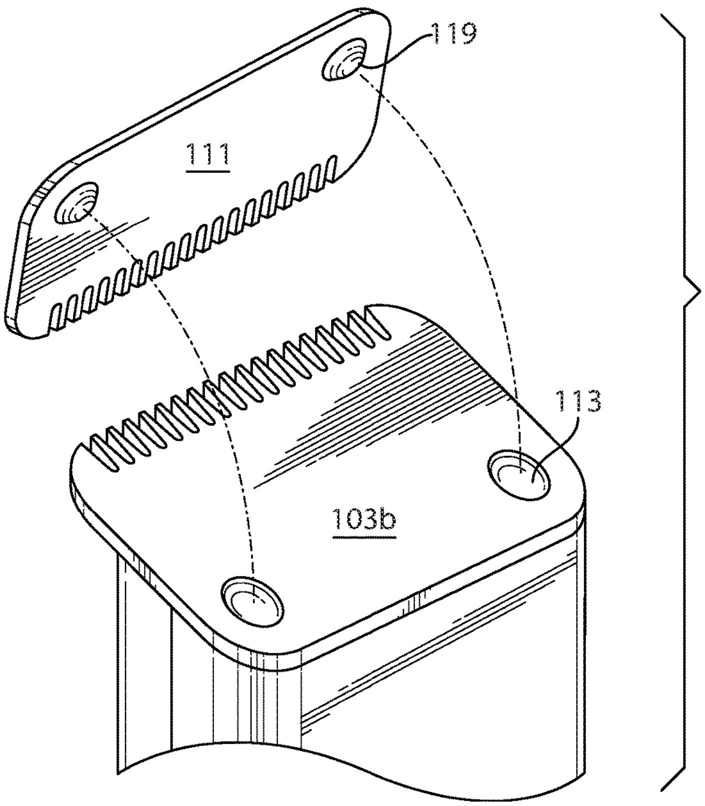
FIG. 9 shows attachment of the trimmer guard of FIGS. 8A and 8B to a trimmer body of FIG. 6.

Embodiments can include a soft magnet (a ferromagnetic material) adhered to metallic material on each trimmer guard and a hard magnet (e.g., neodymium) or any other magnet in the trimmer body. Embodiments can be shaped to have volume as high as desired to generate desired magnetic force. Embodiments can include suitable geometry to allow lodging and dislodging. For example, as shown in FIG. 7, the smaller the angle "a" is, the higher force required to dislodge the guard.

Embodiments can provide a new type of clasp for connecting things together. The magnetic dimple arrangement can be applied in any other suitable area, e.g., in clothing, handbags, and the like. Such embodiments can provide a localized retention force with an anisotropic character that is easy to tune. Embodiments can include a magnetic circuit (e.g., two hard magnets and a soft magnet), and carefully sculpted contacting surfaces. By varying the shape of these contacting surfaces, the size of the lateral breakaway force in comparison to the size of the normal breakaway force can be controlled. Embodiments can have rotational symmetry, however embodiments without rotational symmetry also make sense. Embodiments can allow a guard to be held in position against lateral forces, and yet be easy to remove.

In accordance with at least one aspect of this disclosure, referring additionally to FIGS. 10A-14, a personal care device 100, e.g., as disclosed herein, e.g., as described above, can include a switch 107 that is moveably retained to the housing 101 using a magnetic connection and is otherwise not anchored to the housing 101. In certain embodiments, a personal care device 100 can include a switch 107 that is moveably retained to the housing 100 using a magnetic connection such that different positions have different forces to move the switch therefrom.

Figure 10A:
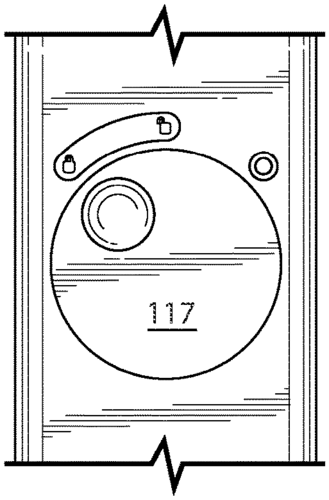
FIGS. 10A, 10B, and 10C show three separate positions of the embodiment of a switch of the device of FIG. 1A, showing a locked position on the left (FIG. 10A), an off position in the middle (FIG. 10B), and an on position on the right (FIG. 10C)
Figure 10B:
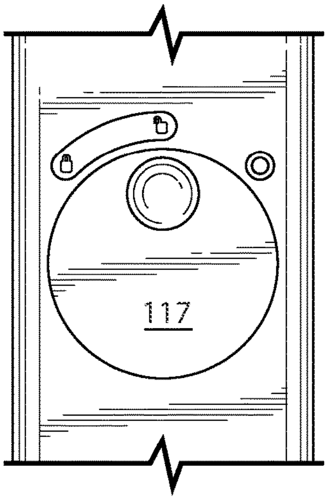
Figure 10C:
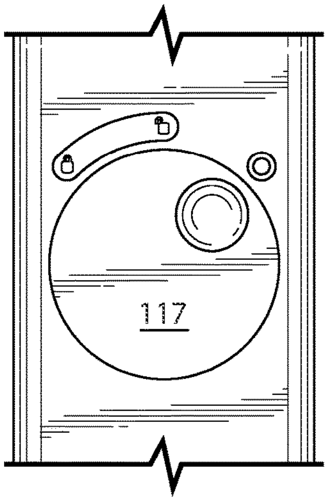
Figure 11A:
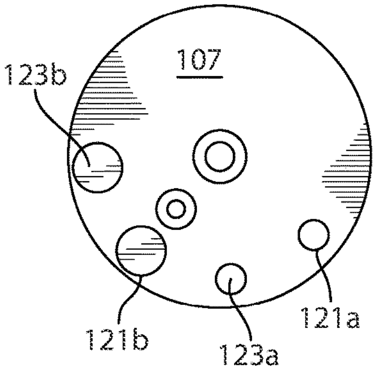
FIGS. 11A, 11B, and 11C illustrate a plan view, perspective view, and side perspective view, respectively, of an embodiment of a switch in accordance with this disclosure shown in a single position (the off position as shown), showing magnets attached thereto, and showing housing magnets in isolation.
Figure 11B:
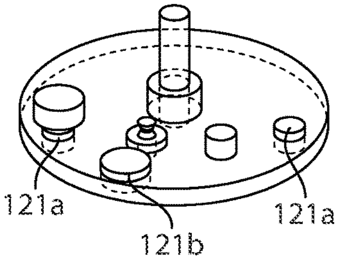
Figure 11C:
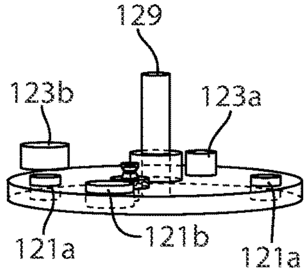
Figure 13:
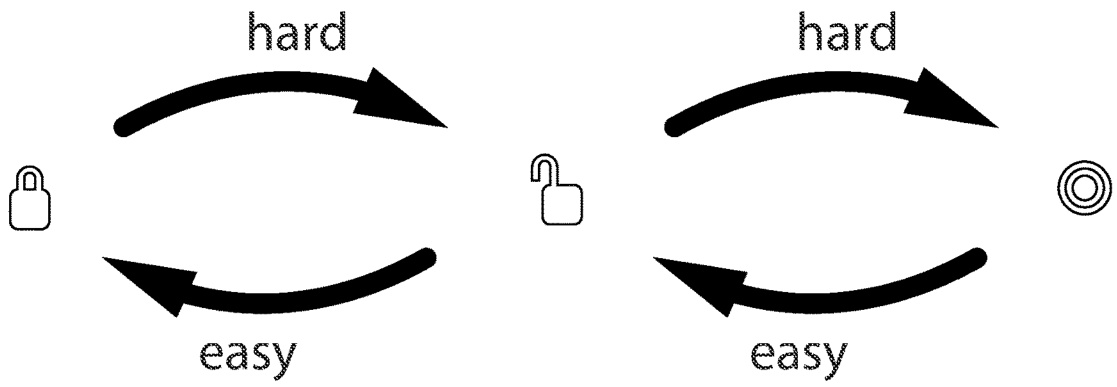
FIG. 13 diagrams an embodiment of a relative force required to switching states of the switch from the different positions.
Figure 14:
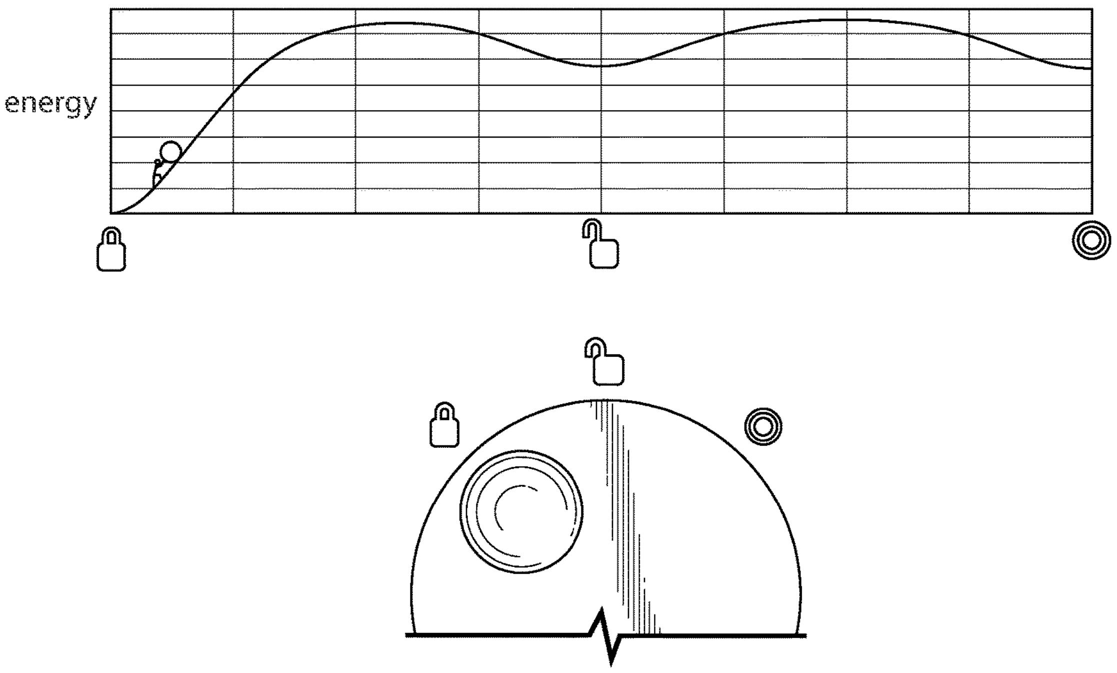
FIG. 14 diagrams an embodiment of energy required along the movement stroke of the switch.
Figure 15:
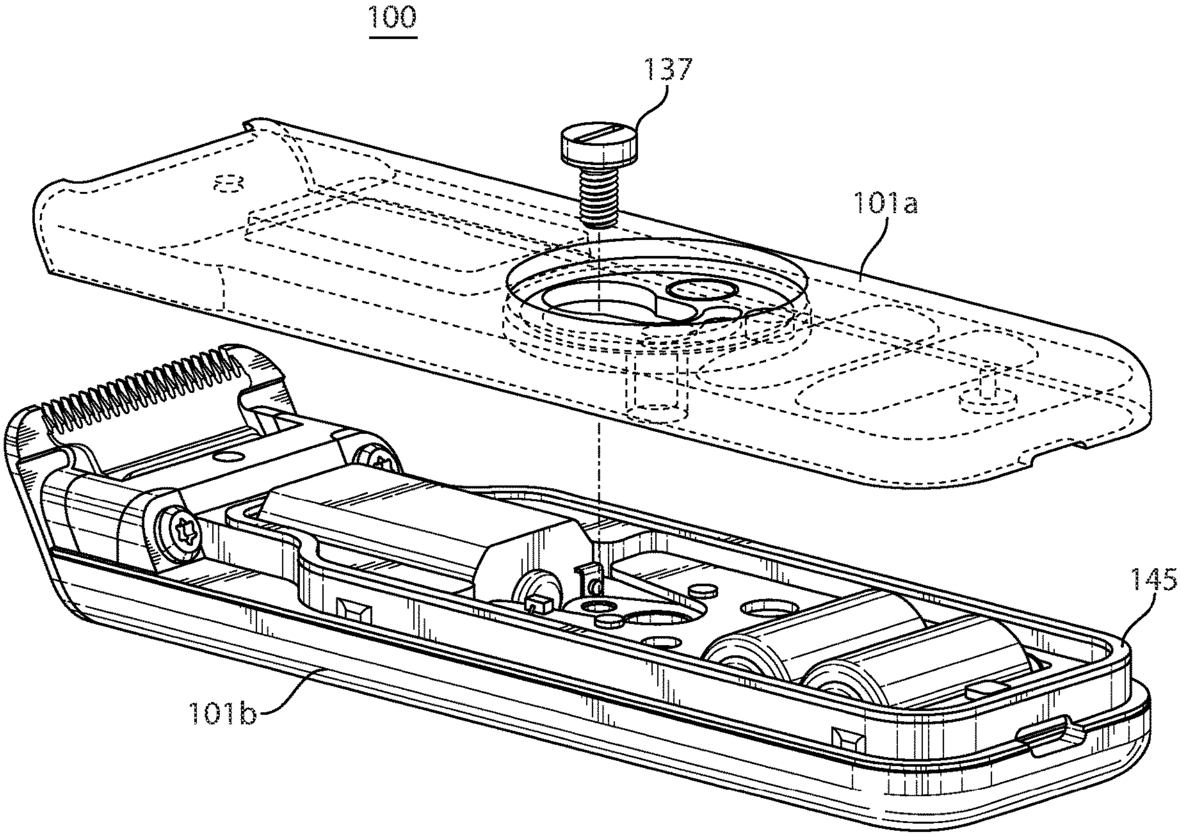
FIG. 15 shows a perspective view of a single fastener attachment for the housing of the embodiment of FIG. 1A.
Figure 16A:
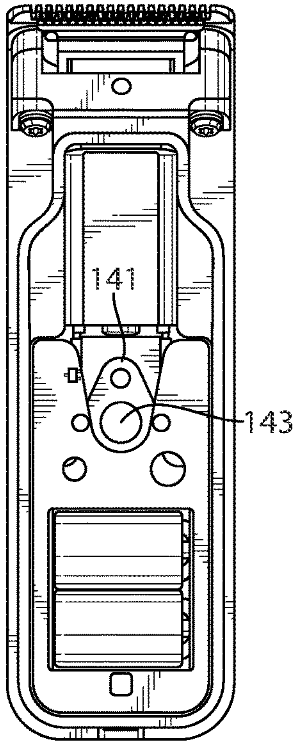
FIGS. 16A, 16B, and 16C show three front views illustrating the installation of a first piece of the housing on the second piece using the single fastener.
Figure 16B:
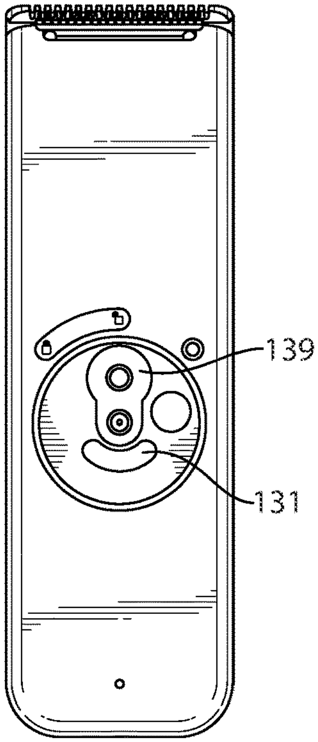
Figure 16C:
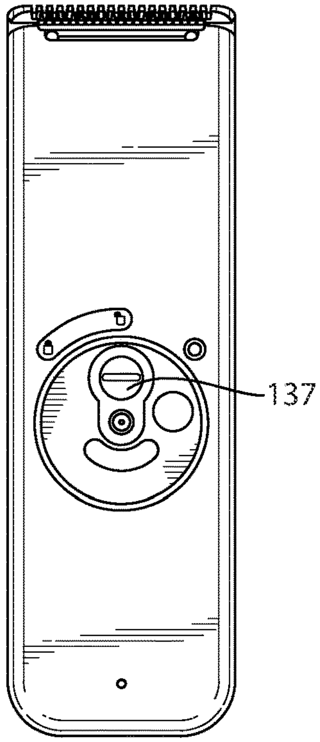
Figure 17A:
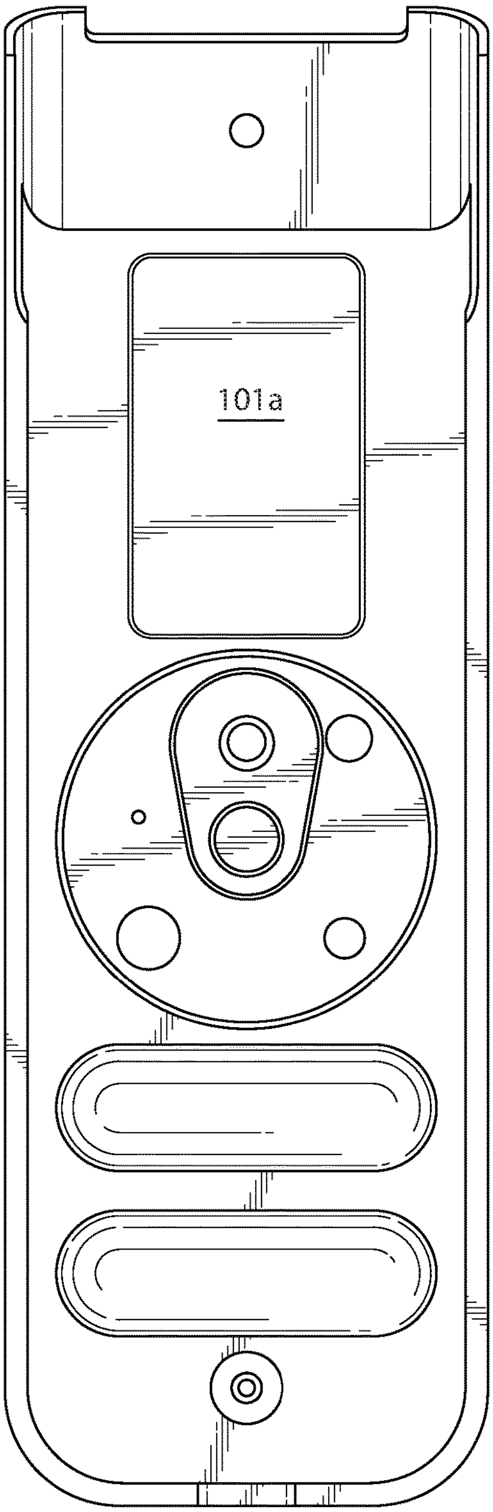
FIG. 17A shows the first piece of the housing of the embodiment of FIG. 1A, shown isolated from the second piece of the housing.
Figure 17B:
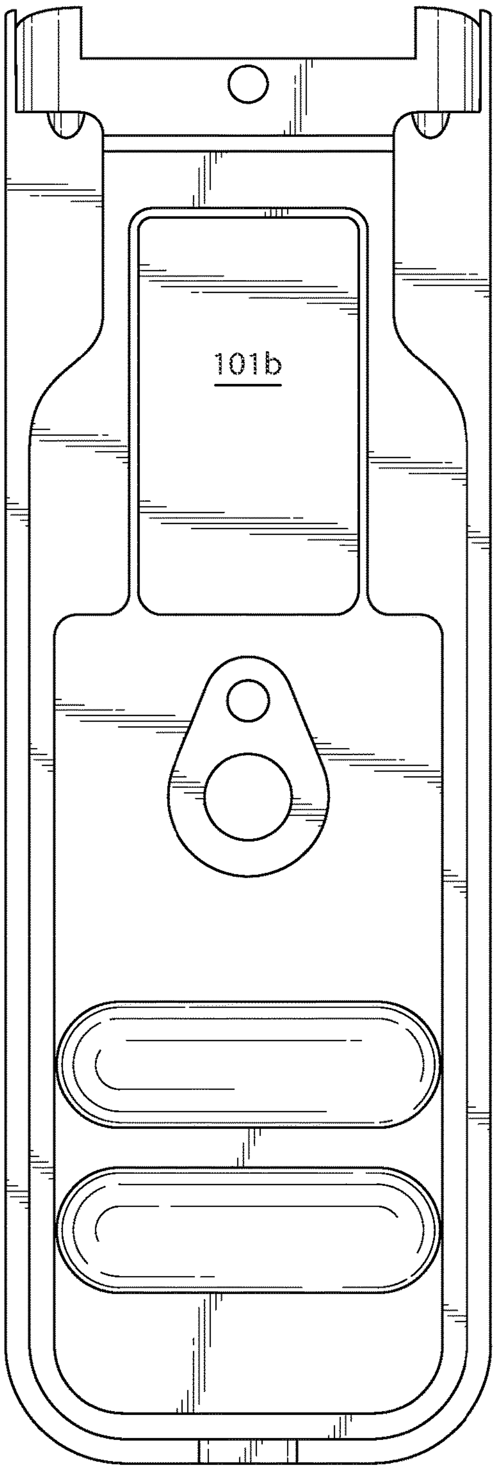
FIG. 17B shows the second piece of the housing of the embodiment of FIG. 1A, shown isolated from the first piece of the housing.

In certain embodiments, the switch 107 can include at least three states (e.g., as shown in FIGS. 10A-10C) including the on position (right), the off position (middle), and a lock position (left). An embodiment of the magnetic connection is shown in FIGS. 11A-11C. An embodiment of a switch structure and corresponding housing is shown in cross-section in FIG. 12. As shown in FIGS. 13 and 14, in certain embodiments, the magnetic connection in the lock position can require the most force to move the switch out of the lock state relative to the other positions. In certain embodiments, the force required to move the switch out of the off position and out of the on position can be the about the same.

The switch 107 can include a plurality of switch magnets 121*a*, 121*b* (e.g., hard magnet and/or soft magnet) mounted on or within an underside thereof. The housing 101 (e.g., first piece 101*a*) can include a plurality of housing magnets 123*a*, 123*b* (e.g., hard magnet and/or soft magnet) disposed on or within the housing 101 in a position configured to magnetically interact with one or more of the plurality of switch magnets 121*a*, 121*b* in at least one of the positions. The switch magnets 121*a*, 121*b* are moveable relative to the housing magnets 123*a*, 123*b* allowing different engagement scenarios.

In certain embodiments, there can be a different amount of housing magnets 123*a*, 123*b* (e.g., two as shown) than switch magnets 121*a*, 121*b* (e.g., three as shown). Any suitable number and/or position of magnets (or material attracted to magnets) is contemplated herein. In certain embodiments, the amount or strength of magnets 121*a*, 121*b*, 123*a*, 123*b* interacting with each other is different between at least two positions. For example, as shown, in the off position, a little housing magnet 123*a* is not engaged with any switch magnet 121*a*, 121*b* (there is a space where little housing magnet 123*a* is) while big housing magnet 123*b* is engaged with a little switch magnet 121*a*. If turned, to the on position, the little housing magnet 123*a* would engage with bit switch magnet 121*b* and no other magnets would be engaged, providing a similar retention force as in the off position. However, if turned to the lock position, big housing magnet 123*b* would be engaged to big switch magnet 121*b*, while a little housing magnet 123*a* would also be engaged to a little switch magnet 121*a* providing greater retention force.

Figure 12:
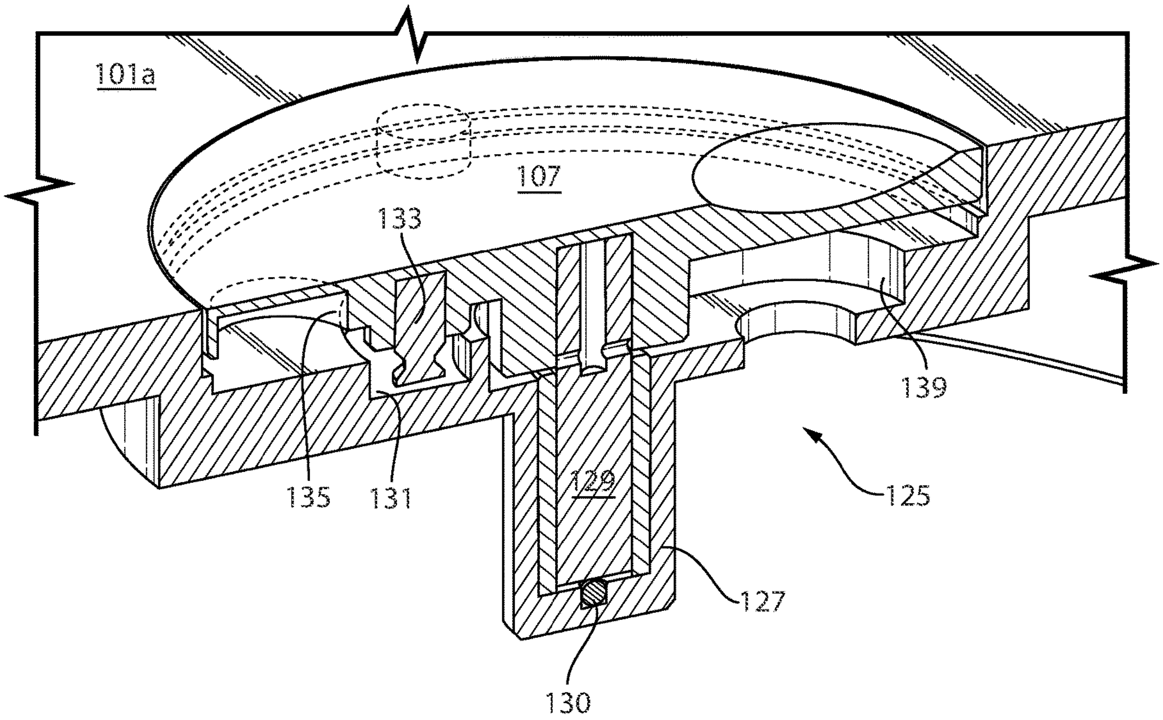
FIG. 12 shows a cross-sectional view of the embodiment of a switch disposed in the housing, shown without magnets in place.

Referring to FIG. 12, the first piece 101*a* of the housing 101 can define a switch housing 125 configured to receive a top shaped switch 107 on an outside thereof. The first piece 101*a* of the housing 101 can include a post well 127 configured to receive a post 129 of the switch 107. A ball bearing 130 can be placed at the bottom of the post well 127 (e.g. in a slot as shown) and can allow the post 129 to rest only on the ball bearing 130 to reduce friction in rotation. The first piece 101*a* can also define a limiter channel 131 configured to receive a limiter post 133 of the switch 107 to limit the extent of the motion (e.g., rotational motion as shown) of the switch 107 when mounted (e.g., to only allow the switch move between the locked position and the on position). The limiter post 133 can include an o-ring or other soft member attached thereto to provide a cushion when contacting the ends of the limiter channel 131. As shown in FIG. 12, the switch magnets are not shown disposed in the magnet apertures 135 in the switch 107.

Embodiments can include magnets on switch (e.g., a dial) and in housing pull down the dial onto a shaft that rests on a single ball bearing (e.g., 1 mm), so the frictional area is small and friction is low. The dial can be pulled off as it is otherwise free floating.

In certain embodiments, the personal care device 100 is a hair trimmer, e.g., as shown. However, any suitable device is contemplated herein, and any suitable portions of this disclosure can be applied to any other suitable device (e.g., electronic devices generally). For example, the above disclosed magnetic switch arrangement can be applied to any suitable device.

Embodiments can include an electronics power switch with tuned haptics which give a user better control over an electronics device, as well as better (haptic) feedback as to the current state of the device. Embodiments of a switch can be a rotary dial with three states, e.g, lock, unlock/off, and on. The lock state is more difficult to exit than any of the others, so that the product won't be inadvertently turned on (e.g., during travel).

Embodiments of a dial as shown can be press-fit onto a shaft that rotates within a plain bearing. This is a sturdy and yet precise way to support the dial, ensuring a high level of concentricity. In the axial direction, the shaft can rest on a single small ball, which can act as a low friction thrust bearing. The ball and shaft can be centered, and so the friction between them is extremely low. The dial can be pulled towards the main case by a system of magnets. These magnets can keep the dial axially positioned, and also provide rotational positioning and haptic feedback. With a desired set of magnets, one can achieve a very particular torque profile for the dial (i.e., torque on the dial as a function of dial angle). Embodiments can make it hard to exit the lock state, and easy to exit any other state. Embodiments can include a single low current Hall sensor within the case operatively connected to a control module to determine whether or not the dial is in the on state to turn on the motor. Embodiments of a housing have no holes due to the dial, and so it serves as a waterproof barrier separating the mechanism of the dial (on the outside) from all of the electronics (on the inside). Other embodiments can include a linear version (e.g., for a toothbrush) of the switch mechanism (not shown).

Referring additionally to FIGS. 15-17B, a hair trimmer (e.g., device 100) can include a clamshell housing 101 having a first piece 101*a* and a second piece 101*b* configured to mate together, a trimmer assembly 103 attached to the housing 101, a motor 105 disposed within the housing 101 and operatively connected to the trimmer assembly 103 to move one or more components of the trimmer assembly 103, and a switch 107 configured to move between at least two states, the at least two states including an on position wherein the motor 105 is activated, and an off position wherein the motor 105 is deactivated. In certain embodiments, e.g., as shown, the first piece 101*a* of the housing 101 and the second piece 101*b* of the housing 101 can be connected together by a single fastener 137.

In certain embodiments, the single fastener 137 can be disposed in a well 139 on the first piece 101*a* configured to be hidden by the switch 107. The first piece 101*a* can define a switch housing 125 as described above configured to receive a top shaped switch on an outside thereof, including a post well configured to receive a post of the switch.

The second piece 101*b* can include a mounting structure 141 on an internal surface thereof defining a post aperture 143 to receive the post well 127. The single fastener 137 can mate with the mounting structure 141 (e.g., in a screw hole as shown). Any suitable type of fastener (e.g., screw, clip, etc.) is contemplated herein. In certain embodiments, the device 100 can include a gasket 145 disposed between the first piece 101*a* and the second piece 101*b* to seal internal components (e.g., motor 105, batteries, circuit board, wires, etc.). In certain embodiments, the first piece 101*a* can include a plurality of magnets disposed in the switch housing 125 (e.g., on an interior side of the first piece 101*a* as shown) to interact with one or more magnets on the switch 107.

Figure 18:
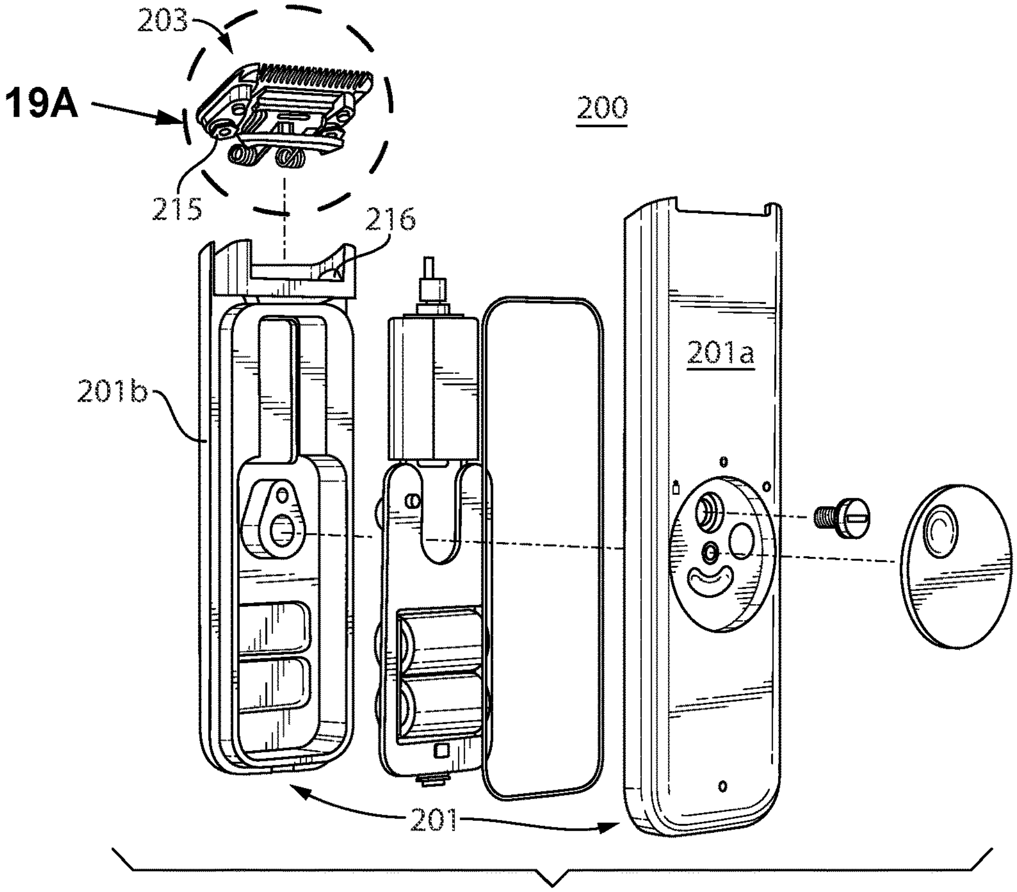
FIG. 18 is a perspective exploded view of another embodiment of a personal care device in accordance with this disclosure.
Figure 19A:
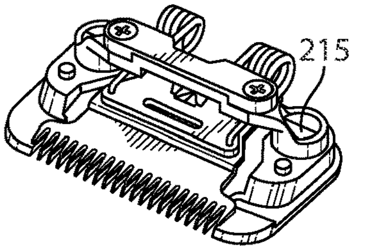
FIGS. 19A, 19B, 19C, and 19D illustrate multiple perspective views of an embodiment of a functional assembly of the embodiment of FIG. 18.
Figure 19B:
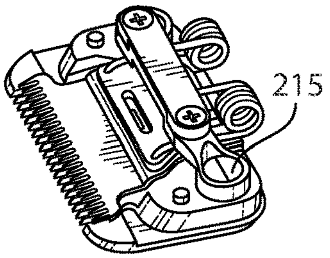
Figure 19C:
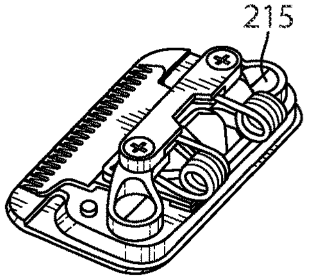
Figure 19D:
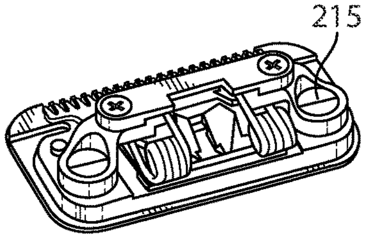
Figure 20:
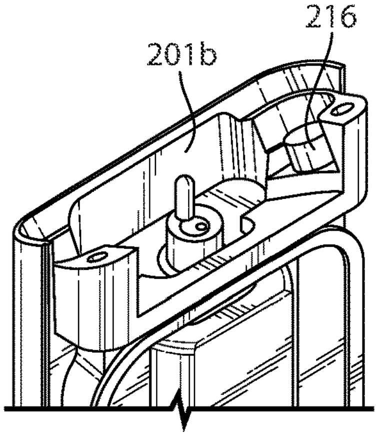
FIG. 20 illustrates a perspective view of the embodiment of FIG. 18, shown without the functional assembly installed.
Figure 21A:
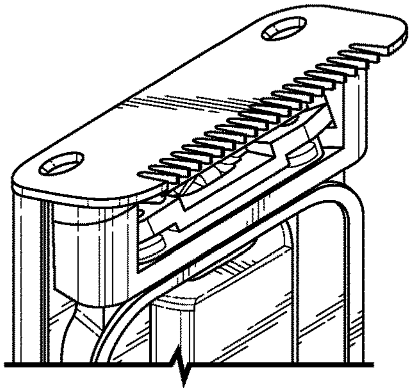
FIGS. 21A and 21B illustrate multiple perspective views of the embodiment of FIG. 18, shown with the functional assembly installed magnetically.
Figure 21B:
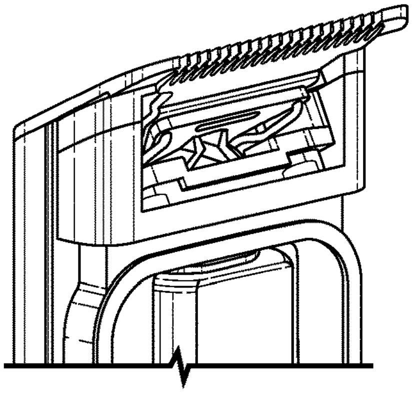
Figure 22A:
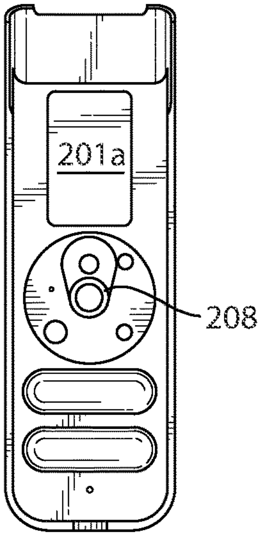
FIGS. 22A and 22B show a plan view and a perspective view, respectively, of an embodiment of a first piece of a housing of the embodiment of FIG. 18.
Figure 22B:
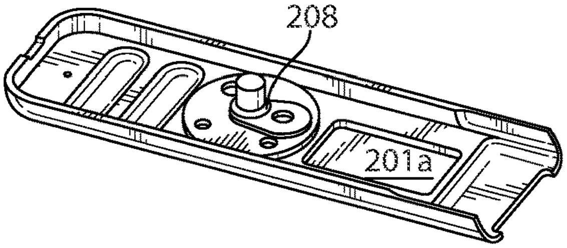
Figure 23A:
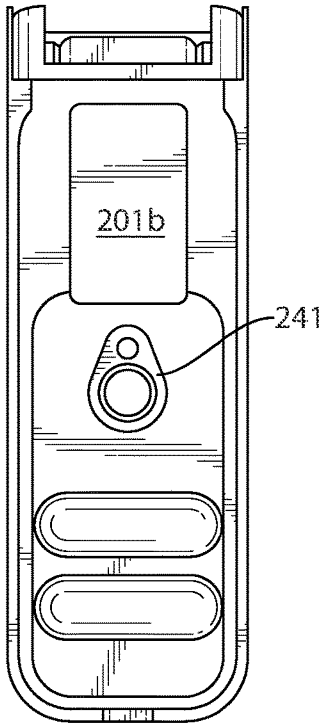
FIGS. 23A and 23B show a plan view and a perspective view, respectively, of an embodiment of a second piece of a housing of the embodiment of FIG. 18.
Figure 23B:
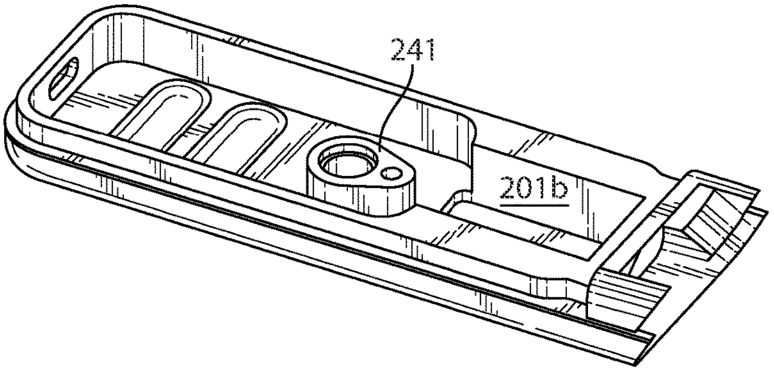

Another embodiment of a personal care device 200 is shown in FIG. 18. Referring additionally to FIGS. 19A-21B, the functional assembly 203 (e.g., the trimming head module) can be configured to magnetically attach to the housing 201 (e.g., second piece 201*b*) and can thus be removable without undoing any screws. For example, the same magnets (e.g., magnets 115, 215) used to magnetically attach to a removable guard (e.g., located under the dimples as described above) can be used to hold the entire functional assembly 203 to the housing 201. In this regard, the housing 201 can include one or more complimentary hard and/or soft magnets 216 that magnetically interact with the magnets 215 as shown in FIG. 19, for example.

Compared to the embodiment shown in FIGS. 1A-17B, this change can eliminate two fasteners (e.g., two large screws) that held the functional assembly 203 (e.g., trimming head) in place and the functional assembly 203 can be a separate, removable module. Also, the magnets 215 can be fixed to the functional assembly 203 in a different manner (e.g., glued within on or more apertures, or otherwise retained in one or more apertures (e.g., not using a threaded hollow screw as shown in the embodiment of FIGS. 1A-17B). Any suitable retaining structure or method for magnets for any embodiment of this disclosure is contemplated herein.

Such embodiments can allow for swapping of the functional assembly 203. For example, a normal beard trimming head module can be replaced with various specialized modules, e.g., a module with a smaller blade or a module that is designed for trimming nose hairs. Any suitable hair trimming module for swapping is contemplated herein.

Figure 24:
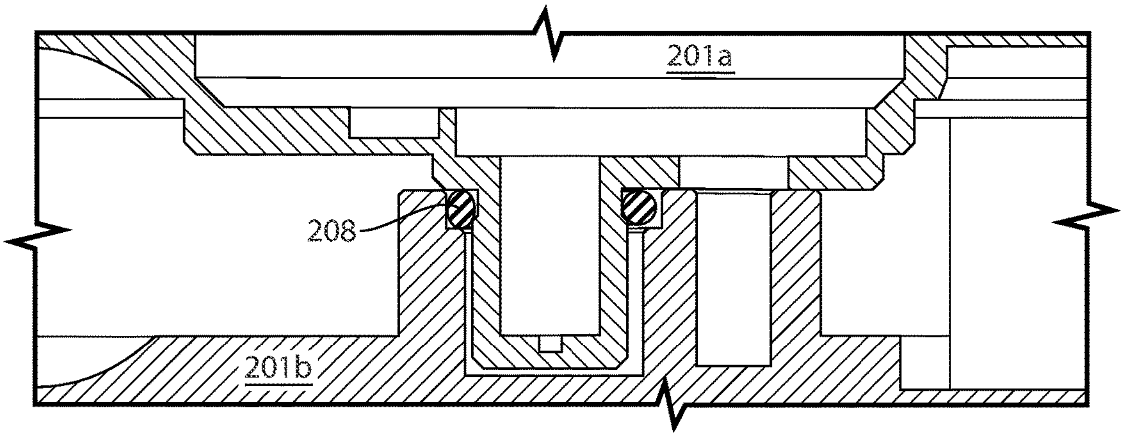
FIG. 24 shows a cross-sectional view of the embodiment of FIG. 18, showing an interface between the first piece and the second piece of FIGS. 22A and 23A having a biasing material therein.

Referring additionally to FIGS. 22A-24, in certain embodiments, a biasing member 208 can be disposed between the first piece 201*a* and the second piece 201*b* to provide a positive bias supporting fastening using the single screw. For example, the biasing member 208 can be an o-ring disposed around the post well 127 to bias the two enclosure parts during assembly. The structure 241 can include an annular groove for receiving the o-ring, for example. The o-ring can be squished (e.g., every so slightly) on one side, e.g., as shown in FIG. 24.

Figure 25:
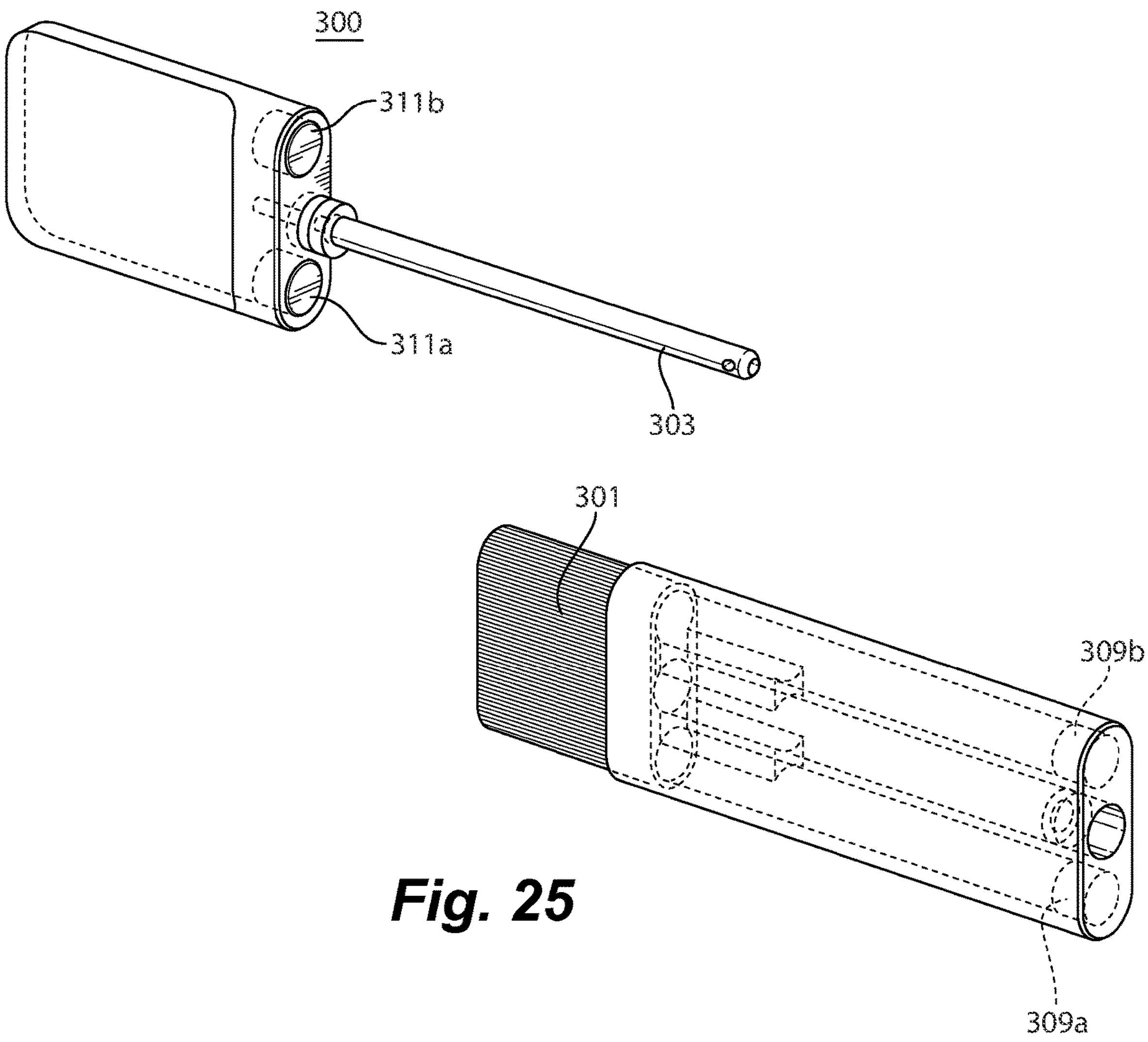
FIG. 25 shows an exploded view of an embodiment of a tool in accordance with this disclosure.
Figure 26:
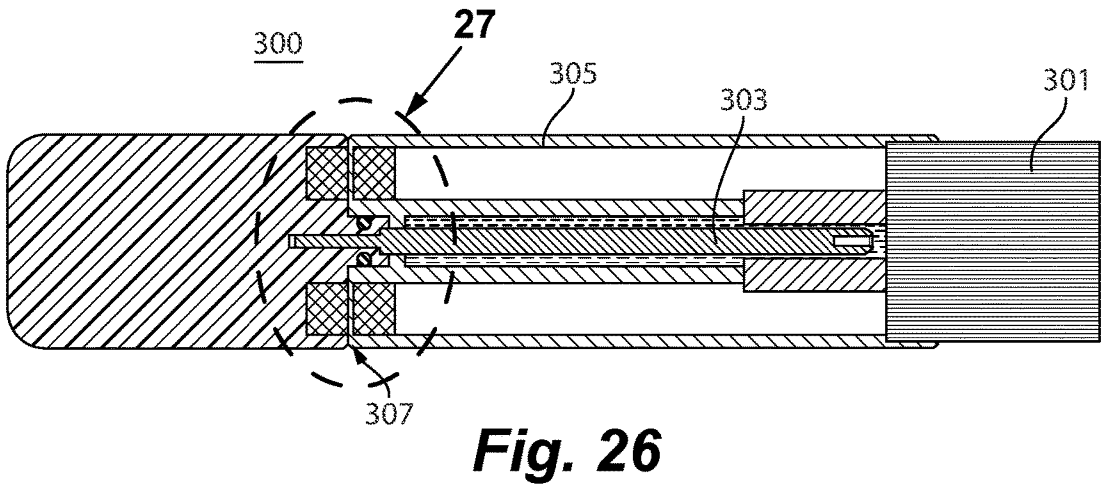
FIG. 26 illustrates a cross-sectional view of the tool of FIG. 25, shown assembled.
Figure 27:
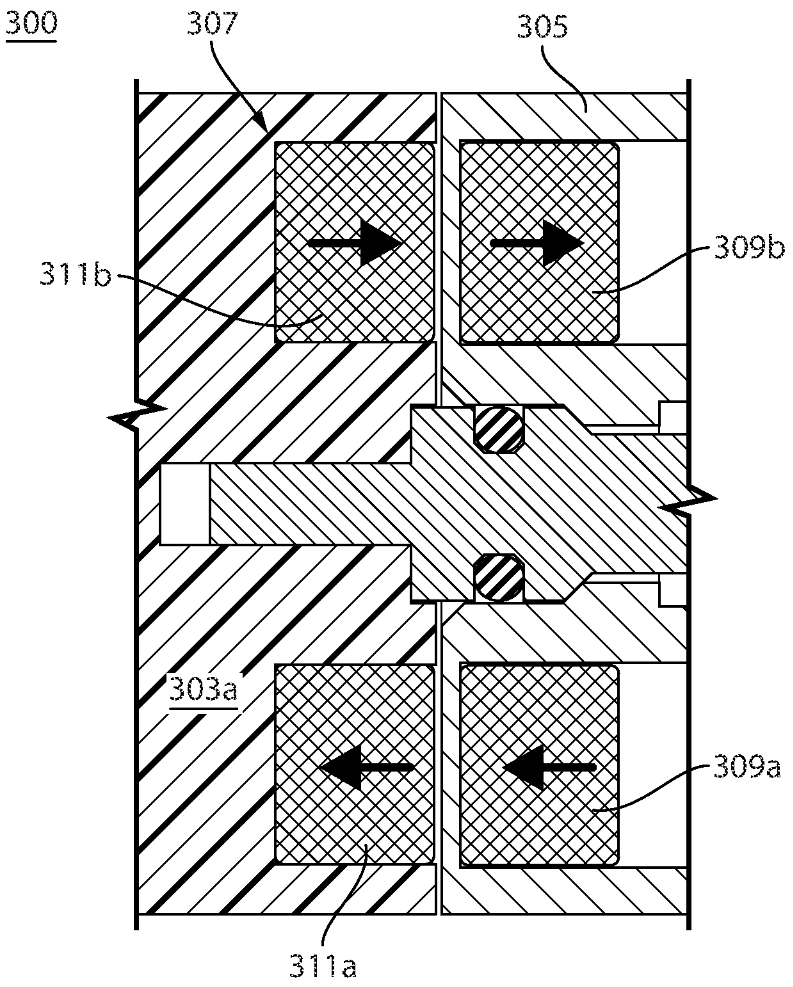
FIG. 27 shows a partial cross-sectional view of the tool of FIG. 26, illustrating an embodiment of the polarity of magnets disposed therein.

FIG. 25 shows a view of an embodiment of a tool 300, shown separated. FIG. 26 illustrates a cross-sectional view of the tool 300 in an assembled state. FIG. 27 shows a partial cross-sectional view of the tool 300 illustrating an embodiment of the polarity of magnets disposed therein. Embodiments of a tool 300, e.g., as shown, can be a maintenance tool having a brush 301 and oiler 303, for example. The oiler 303 can be configured to insert into a reservoir 305, e.g., as shown. The brush 301 can be attached to the reservoir 305.

The tool 300 can also include a magnetic clasp arrangement 307 that keeps the oiler 303 locked to the reservoir 305 when not in use. The magnetic clasp arrangement 307 can include a first magnet 309*a* retained by the reservoir 305 and a second magnet 309*b* retained by the reservoir 305. The magnetic clasp arrangement can also include a first magnet 311*a* and a second magnet 311*b* retained by the oiler 303 (e.g., within a tab 303*a* of the oiler 303) and configured to interact with a corresponding magnet 309*a*, 309*b* of the reservoir 305. Any suitable combination of magnets (e.g., hard or soft or both) is contemplated herein.

The magnets 309*a*, 311*a* and 309*b*, 311*b* can have paired opposite polarity, e.g., as shown in FIG. 27. This can allow the oiler 303 to attach to the reservoir 305 in only a single rotational position. Any other suitable polarity is contemplated herein. Any other suitable arrangement of one or more magnets and/or any other suitable latch type to attach the reservoir to the oiler is contemplated herein.

Embodiments can include a hair trimmer means as described herein. Embodiments can include a magnetic switch means for electronic devices, (e.g., hair trimmers, toothbrushes, etc.) as described herein. Embodiments can include housing means for hair trimmers. Any suitable components of a personal care device and/or hair trimmer disclosed herein can be applied to any suitable electronic devices, and are not limited to personal care devices and/or hair trimmers.

Embodiments can include a beard trimmer. The trimmer itself can include an enclosure, motor, battery, board, on/off dial, LED indicator, etc. Embodiments can include one or more guards or combs, each of which attach magnetically to the trimmer. The trimmer can be made of inherently valuable materials and can utilize anodization on an interior and/or exterior surface to make the product more durable. Embodiments of the housing pieces can be made of aluminum, and can be easy to separate from the other components. Embodiments can be designed to be maintained and to last a lifetime. Embodiments can be waterproof since the switch mechanism can exist without a penetration into the housing. The housing can include a gasket between pieces, and the single fastener can include a gasket as well, blocking the only points of entry.

Embodiments can be submerged for a certain time with no damage. Embodiments can function under water can be used in the shower. Embodiments can be lithium-ion powered and utilize USB-C charging, the port of which can also include a seal to the housing.

Embodiments can include an LED display. For example, the device can include a single white LED, with an embodiment of behavior such that the LED can be off when the product is not on and not charging, the LED can pulse if the product is plugged in and charging, the LED can be a solid color whenever the product is on and charged above some threshold, and the LED can flash with a different pattern when the battery is low or when a faulty battery condition is detected. (e.g., in groups of three).

Embodiments can include a soft starting motor. For example, embodiments can include a control module configured to pulse width modulate (PWM) the DC motor so that it turns on gradually (e.g., over half a second or so), rather than turning on and off abruptly.

Embodiments can include a single fastener. A suitably rigid housing can support use of a single screw as shown. The fastener can be roughly in the middle of the device and can be disposed under the dial in a fastener cutout to not interfere with the switch. The single fastener can secure the enclosure pieces of a product in a way that is both secure and easy to disassemble.

For example, a single centrally located M4 screw holding the two enclosure parts together can be hidden under the rotary dial. One immediate effect can be that the space previously dedicated to numerous small fasteners can now be used for other things (such as the board or the battery). One more subtle effect can be that a single large screw makes the product easier to disassemble and repair, for instance by replacing worn out batteries. Ease of repair and recyclability are two benefits enabled by embodiments of this disclosure. Embodiments utilizing a single fastener can hold together not only the enclosure pieces, but all of the internal electronics as well (e.g., board, batteries, and motor).

One or more embodiments can include one or more control modules and/or circuit boards. As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A personal care device, comprising:

a housing;

a functional assembly attached to the housing;

a motor disposed within the housing and operatively connected to the functional assembly to move one or more components of the functional assembly; and a switch configured to move between at least two states, the at least two states including an on position wherein the motor is activated, and an off position wherein the motor is deactivated, wherein the switch is magnetically coupled to and moveably retained to the housing, wherein moving the switch from the on position requires a first force and wherein moving the switch from the off position requires a second force difference from first force, wherein the switch includes at least three states including the on position, the off position, and a lock position, wherein the lock position requires more force to move the switch out of the lock position than a force required to move the switch out of the on position or out of the off position, wherein the switch includes a plurality of switch magnets mounted on or within an underside of the switch, wherein the housing includes a plurality of housing magnets disposed on or within the housing in a position configured to magnetically interact with one or more of the plurality of switch magnets in at least one of the states to magnetically couple the switch to the housing.

2. The personal care device of claim 1, wherein an amount of housing magnets in the plurality of housing magnets is different than an amount of switch magnets in the plurality of switch magnets.

3. The personal care device of claim 1, wherein an amount of magnets interacting with each other and/or a strength of magnetic interaction between interacting magnets is different between at least two states.

4. The personal care device of claim 3, wherein a force required to move the switch out of the off position and a force required to move the switch out of the on position is the about the same.

5. The personal care device of claim 1, wherein the personal care device is a hair trimmer.

6. A hair trimmer, comprising:

a clamshell housing having a first piece and a second piece configured to mate together;

a trimmer assembly attached to the housing;

a motor disposed within the housing and operatively connected to the trimmer assembly to move one or more components of the trimmer assembly; and a switch configured to rotate between at least two states, the at least two states including an on position wherein the motor is activated, and an off position wherein the motor is deactivated, wherein the first piece of the housing and the second piece of the housing are connected together by a single fastener, wherein the single fastener is disposed in a well on the first piece configured to be hidden by the switch in an assembled state, wherein the first piece defines a switch housing configured to receive a top shaped switch on an outside thereof, including a post well configured to receive a post of the switch, wherein the second piece includes a mounting structure defining a post aperture on an internal surface thereof to receive the post well, wherein the single fastener mates with the mounting structure.

7. The hair trimmer of claim 6, further comprising a gasket disposed between the first piece and the second piece to seal internal components.

8. The hair trimmer of claim 6, wherein the first piece includes a plurality of magnets disposed in the switch housing to interact with one or more magnets on the switch.

* * * * *